UNITED STATES PATENT OFFICE.

HENRY BLUMENBERG, JR., OF NEW YORK, N. Y.

BATTERY SOLUTION.

SPECIFICATION forming part of Letters Patent No. 625,015, dated May 16, 1899.

Application filed September 17, 1898. Serial No. 691,133. (No specimens.)

*To all whom it may concern:*

Be it known that I, HENRY BLUMENBERG, Jr., a citizen of the United States, residing at Wakefield, in the borough of Bronx, in the city and State of New York, have invented an Improvement in Battery Solutions, of which the following is a specification.

In the present instance I make use of a chlorate of an alkali metal or alkali-earth metal, together with a bisulfate of an alkali metal or alkali-earth metal. I prefer to make use of a chlorate of sodium and a bisulfate of sodium in about equal proportions mixed with water and introduced into a cell of the primary battery, and I find an electrolytic solution formed of the aforesaid materials is more constant in use and more durable than the battery solutions heretofore employed, and the zinc is not so rapidly consumed and the current is more intense and continuous than could heretofore be obtained from a battery of the same size.

I do not limit myself to the proportions of chlorate and bisulfate of alkali metal or alkali-earth metal made use of; but I find that about one pound of chlorate of sodium and one pound of bisulfate of sodium dissolved in three quarts of water form a reliable electrolyte for a primary battery.

I claim as my invention—

1. The battery solution herein described consisting of a chlorate of an alkali metal or alkali-earth metal, and a bisulfate of an alkali metal or alkali-earth metal in approximately equal proportions, and mixed with water, substantially as set forth.

2. An electrolyte for a primary battery, composed of chlorate of sodium and bisulfate of sodium in about equal proportions mixed with water, substantially as specified.

Signed by me this 15th day of September, 1898.

HENRY BLUMENBERG, JR.

Witnesses:
GEO. T. PINCKNEY,
E. E. POHLÉ.